Patented Jan. 18, 1949

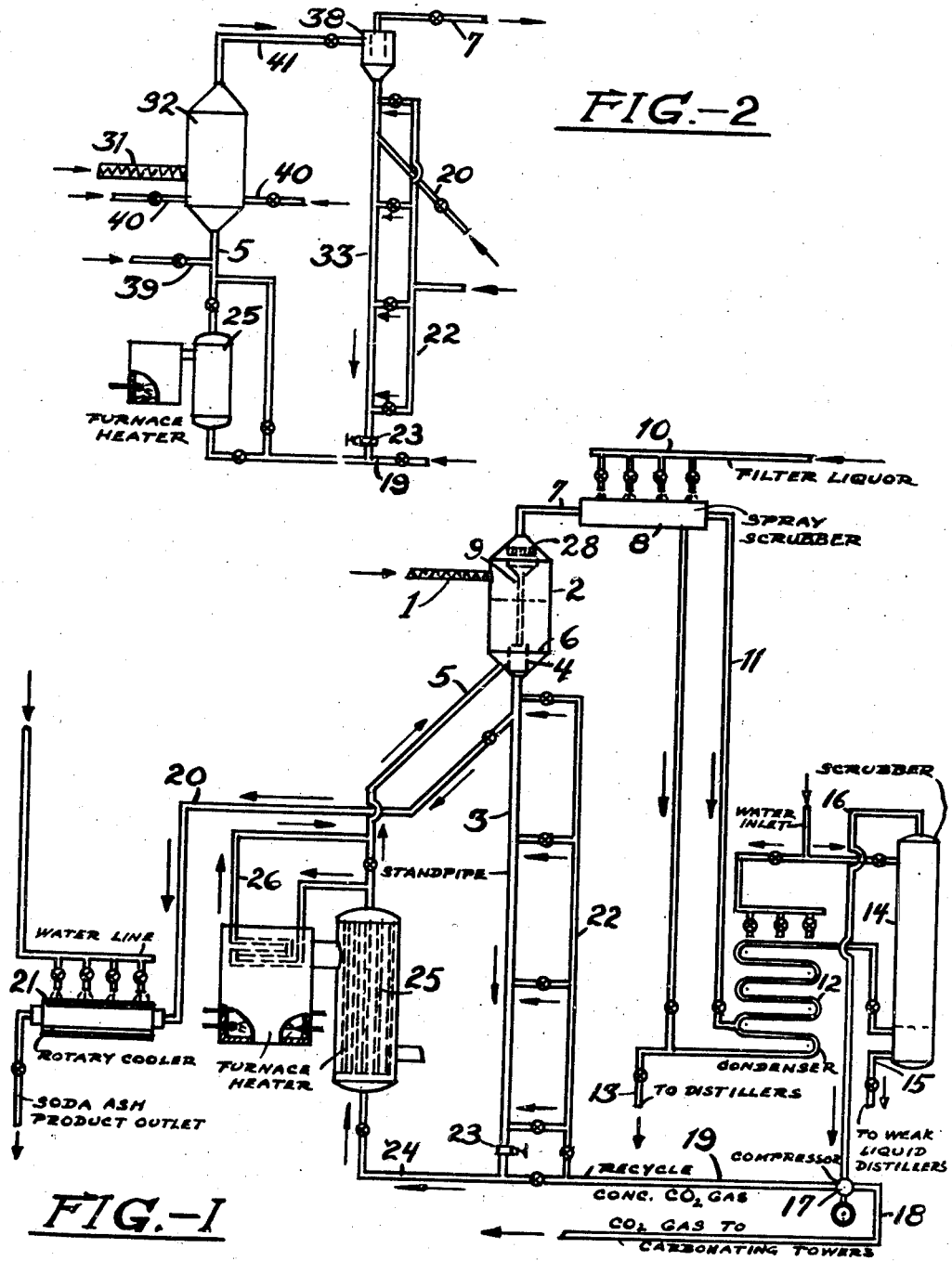

2,459,414

UNITED STATES PATENT OFFICE 2,459,414

PRODUCTION OF SODA ASH

Egbert Wendell Carrier, Cranford, N. J., assignor to Standard Oil Development Company, a corporation of Delaware Application November 7, 1942, Serial No. 464,835

2 Claims. (Cl. 23—63)

This invention relates to an improved method for the preparation of sodium carbonate from sodium bicarbonate and is especially suited for use in connection with the Solvay process in which the sodium bicarbonate is made by reacting sodium chloride, ammonia, carbon dioxide and water.

It has heretofore been customary in the Solvay process for the manufacture of soda ash to calcine the crude sodium bicarbonate in direct fired rotary horizontal driers. This operation is conducted with low thermal efficiency and involves large moving apparatus of relatively low capacity. Moreover, direct fired rotary driers are subject to uneven temperatures through the product and drier shell, which promotes not only lumping of the feed, but more seriously the formation of hard scale on the internal surfaces, reducing heat transfer and enhancing the danger of overheating and warping the steel shell of the drier.

The present invention provides a method for conducting the calcining operation with much improved fuel economy and in stationary apparatus of high capacity in which the temperature is uniform and subject to very simple and accurate control. Other and further objects of the invention will be apparent from the drawings, the following description and the claims.

Figure 1 of the drawings is a diagrammatic illustration in sectional elevation of one suitable type of apparatus for carrying out the process of this invention. Figure 2 is a diagrammatic illustration in partial sectional elevation of an apparatus suitable for carrying out another modification of the process of this invention.

Referring to Figure 1, sodium bicarbonate is supplied by any suitable means such as the screw feeder 1 to a reaction vessel 2 which connects at the bottom to a long standpipe 3. This sodium bicarbonate may be from any suitable source and is preferably secured from the filters of the Solvay process. In this event the particle size is fixed by the method and conditions for efficient precipitation and filtration, such sizes being suitable for calcining in the present Solvay process. This precipitate may be moist, or it may be dried to any desired extent before passing to vessel 2. It should, however, be in a finely-divided solid form, with a particle size smaller than about 60 mesh and preferably smaller than 100 mesh with not more than a minor proportion having a particle size below about 400 mesh. The reaction vessel 2 may be provided with a cylindrical partition 4 between the standpipe connection and the gas inlet line 5. It may also be provided with a perforated horizontal baffle 6 in the annular space between the partition 4 and the reaction vessel wall to aid the uniform dispersal of gas and solids in the reaction vessel.

Hot gases are introduced into the lower portion of the vessel 2 by line 5 and, in passing upwardly through this vessel, maintain the solid material therein in a violently agitated state. The upward velocity of gas through vessel 2 is sufficient to partially lift the solid material and to maintain it as a dense suspension but is not sufficiently great to carry over any large proportion of solids. Thus, some settling of the suspended particles is permitted, so that a dense suspension exists in the lower portion of the reaction vessel. The upper level of this dense suspension should be a substantial distance below the top in order to reduce the amount of solids entrained in the gases leaving the reaction chamber. This distance may be from about 5 to 15 feet or more. The velocity of the gases passing upwardly through the reaction vessel 2 may be, for example, between the approximate limits of 0.2 and 5.0 feet per second, preferably between 0.5 and 2.5 feet per second at least in the upper portion of the vessel, depending upon the particle size of the solid material. This state of violent agitation provides efficient contact of the solids with the hot gases and greatly aids the calcination of the sodium bicarbonate to soda ash. It also provides a remarkably uniform temperature throughout the calcinating zone and permits close control of the temperature and the quality of the soda ash product. The calcined product is withdrawn from the vessel 2, preferably from the lower portion of this vessel inside the baffle 4 or from the standpipe 3, by line 20 and is cooled by any suitable method such as by the rotary cooler 21 and then passed to storage or to suitable packaging equipment. The cooling may also be accomplished by passing a stream of the calcined product through an externally cooled pipe 20 or heat exchanger, while providing sufficient gas preferably at spaced points along the pipe 20 to maintain the solid material as a freely flowing suspension. The product may also be cooled by direct contact with a cooling gas, such as air, or the recycled carbon dioxide gas in line 19 before it is used to circulate return ash through the heater 25. Such direct contact may suitably be carried out in a vessel operated in the same manner as vessel 2.

While the calciner 2 may be heated indirectly by heat applied to the walls or through heat exchanger surfaces located therein such as coils for high pressure superheated steam or other heating fluids, this heating may also be done by the hot gas, such as recycled carbon dioxide, introduced through line 5 or by recycling soda ash from the calciner 2 through an external heater 25. In this method of operation soda ash is withdrawn from the vessel 2 into the standpipe 3, thus providing a long column of a solid suspension of high density. A sufficient amount of a gas, such as the recycled carbon dioxide, is supplied at spaced points along this column as by line 22 to maintain the solid material in a mobile or suspended state. This can be accomplished with a relatively small amount of gas, amounting to a total of about 0.5 to 5.0 cubic feet per 100 pounds of ash measured under the conditions of highest pressure prevailing at the bottom of the column. In many cases, especially where the solids are recirculated at relatively high rates, the amount of gas occluded in the solids leaving the reaction zone may be sufficient to maintain it in a fluidized state without adding additional gas to the column. When operating in this manner with finely powdered solids, each particle of solid appears to be surrounded by a thin film of gas and the entire mass has the mobility of a freely flowing liquid. Also, it follows the hydraulic laws in generating a pressure at any point equal to the product of the average density and the height of the suspension. Return flow to the top of the standpipe is thus made possible simply by providing enough additional gas to maintain a lower density in the return side of the cycle, the cycle operating in a manner analogous to a liquid thermo-syphon. Thus, the "fluidized" solid is released at a controlled rate through valve 23, at the bottom of the standpipe 3, into a stream of gas, suitably a recycled carbon dioxide gas from the calciner products, in line 24 to provide a more dilute suspension of solids in line 24 than in standpipe 3. The pressure in line 24 is less than that just above valve 23. This stream in line 24 is passed through suitable heating equipment such as the furnace-fired heat exchanger 25 and is heated therein to a temperature substantially higher than the temperature desired in the calciner 2. The heated suspension is then returned to the calciner by line 5. A final heating of all or a portion of the suspension in the radiant heater 26 may be used to complete the introduction of heat or for more accurate and efficient temperature control.

Gases liberated during drying and decomposition of the crude sodium bicarbonate as well as recycle gases are withdrawn from the vessel 2 by line 7 after passing through suitable solids separating equipment such as the cyclone type separator 28 which may be conveniently disposed inside the top of the reaction vessel or it may be placed in the gas exit line outside this vessel. Several stages of separators may of course be used in series to increase the efficiency of the solids separation. The separated solids are preferably returned to the reaction vessel or to the solids recycle system as by line 9.

The gases leaving the reaction vessel contain ammonia in addition to carbon dioxide and water vapor and are passed through suitable cooling, scrubbing, condensing and water washing equipment to separate water and ammonia from the carbon dioxide gas. The hot gas may, for example, be passed through a spray scrubber 8 in which it is cooled and scrubbed by being passed through a spray of liquid, suitably the filtrate or "filter liquor" obtained from the sodium bicarbonate filters of the Solvay process by line 10. The gas may then be passed by line 11 through an externally cooled condenser 12 and the resulting condensate together with the wash liquor from the spray scrubber 8 are withdrawn by line 13 to the Solvay distillers for the recovery of ammonia. The cooled gas is then passed countercurrent to water or other suitable solvent in scrubbing tower 14 for the further recovery of ammonia, the enriched solvent being passed by line 15 to the Solvay weak liquor distillers for ammonia recovery. The resulting gas which is carbon dioxide of 90% or higher concentration is passed by line 16 to compressors 17, which are ordinarily used to return the carbon dioxide to the carbonating towers of the Solvay process by line 18. A part of this compressed gas is used as recycle gas to circulate the solids in the improved calcining operation and is continuously returned through line 19, which connects with the bottom of the standpipe 3.

Figure 2 illustrates an alternate type of calcining vessel 32 which may be used in place of the calciner 2 in Figure 1. Parts which are the same as in Figure 1 are indicated by the same numbers. The chief difference is that the vessel 32 is designed for all solids and gases to be taken overhead through line 41 to a separating means 38 which may be a cyclone separator, a number of such separators in series followed by a Cottrell type precipitator, or other suitable means for separating the finely divided solids from the gas. Higher gas velocities, ranging from 0.2 to 25 feet per second, may be used in this type of reaction vessel, velocities of about 0.5 to 5.0 feet per second being generally preferred. The gases are passed from such separating means through line 7 to suitable cooling and ammonia recovery equipment as illustrated in Figure 1. The separated solids pass into the standpipe 33 for recycling through heater 25. Calcined material may also be withdrawn to storage through line 20, as in Figure 1. The crude sodium bicarbonate is supplied to the calciner as in Figure 1 by a screw conveyer 31 or other suitable feeding means. The gases supplied through line 5 are passed upwardly through the vessel 32 at a sufficient velocity to maintain the solids therein in a mobile suspended state although preferably the velocity is sufficiently low to permit much "slippage" between solids and the gas and a much longer average time of residence of solids, than of gas, in the vessel 32. However, the upward gas velocity may be considerably higher than in vessel 2. The density of the solids suspension in the vessel 32 depends both on the rate of supply of solids thereto as well as upon the upward gas velocity.

While it is preferred to supply the necessary heat for the calcining operation by indirect means, as by the heater 25, when soda ash of high purity is desired, the heating might also be done by injecting highly heated gases, such as hot combustion or flue gases, directly into the calciner by lines 40 or into the recycle line 5 by line 39. This heating may also be accomplished by burning fuel in the reaction vessel 32. A combustible mixture of fuel gas, oil or powdered coal and air may be supplied through line 39 or the combustible material and air may be supplied separately to the reaction vessel 32 by lines 40. However, the purity of the product will generally be lower when heating by such direct contact with combustible materials and the recovery of ammonia involves washing a greater volume of gas. In order to avoid undesirable dilution of the resulting carbon dioxide gas excess air should not be used for the direct combustion.

As an example of the process of this invention involving apparatus as illustrated in Figure 1, crude sodium bicarbonate may be supplied directly from Solvay process rotary vacuum filters to a calciner 11 feet in diameter and 40 feet high connecting with a standpipe 50 feet in height. The operation is preferably started with a hot charge of previously manufactured soda ash in the calciner for recycling and heating (although the crude bicarbonate might be heated in the calciner, without recycling, by passing hot gas through it). Continuous operation may be obtained by maintaining the temperature in the calciner at about 400° F. and allowing 25 minutes' solid contact time to complete the decomposition. Heat is supplied during continuous operation by recycling 5 parts of return ash from the standpipe per part of soda ash product. The return ash is suspended in recycled concentrated carbon dioxide gas which amounts to 25–30% of that generated by decomposition of the crude bicarbonate feed and returned to the carbonating towers. The return ash suspension is superheated to about 820° F. in a vertical tubular heater and thence flows at this temperature into the bottom of the calciner. A gas velocity of 0.5 foot per second up through the calciner gives a concentration of solids in the dense, lower portion of the dispersion of about 20 pounds per cubic foot. One part of the ash passing into the standpipe (per 5 parts of recycle) is withdrawn and cooled to about 175° F. before packaging or storage as product. Operating in the manner described, this calciner will have a product capacity exceeding 120 tons of soda ash per day, or over twice the capacity of former direct fired rotary horizontal driers.

It will be understood that the upward gas velocity in the calciner and the proportion of recycled material to product withdrawn may be adjusted to provide any desired time of contact and to secure decomposition of the sodium bicarbonate to soda ash to any extent desired. If, however, under the conditions shown in the foregoing example the soda ash product is contaminated with too much undecomposed bicarbonate (more than 0.5%), the product can be further dried by running through one or more additional calciners in series operating on the same principle.

It is also to be understood that while the above description is intended to present preferred embodiments of the process of this invention, it also includes such other variations and modifications as come within the scope thereof.

For example the calciners of Figure 1 or 2 might be employed in an adaption of this process to the preparation of so-called "dense" ash, in which about 16 per cent of water is mixed with light soda ash of about 0.54 bulk density, then fed in place of crude bicarbonate into the calciner, and dried by means of superheated return ash-gas suspension. The resulting dense ash would have a bulk density of 0.95–1.0, and has special uses as in glass manufacture.

I claim:

1. Process for the manufacture of soda ash, which comprises maintaining a fluidized mass of previously manufactured soda ash in a rising carbon dioxide gas stream within a confined reaction zone, introducing sodium bicarbonate into said reaction zone, decomposing said bicarbonate while in said zone into soda ash, carbon dioxide and water vapor, withdrawing soda ash solids from said reaction zone, separating the soda ash solids withdrawn from the reaction zone into two streams, heating one of said streams to a temperature substantially higher than the temperature in said reaction zone, returning the thus heated stream of soda ash solids directly into said reaction zone to maintain the decomposition temperature for decomposing the sodium bicarbonate therein, and cooling the other stream of withdrawn soda ash solids to recover the desired soda ash product.

2. The process as described in claim 1, wherein the sodium bicarbonate introduced into said reaction zone is a finely divided crude sodium bicarbonate containing ammonium bicarbonate, and ammonia is removed with carbon dioxide and water vapor from an upper portion of said reaction zone.

EGBERT WENDELL CARRIER.

REFERENCES CITED

The following references are of record in the file of this patent:

UNITED STATES PATENTS

| Number | Name | Date |
| --- | --- | --- |
| 243,991 | Solvay | July 5, 1881 |
| 263,281 | Solvay | Sept. 5, 1882 |
| 439,330 | Staub | Oct. 28, 1890 |
| 1,984,380 | Odell | Dec. 18, 1934 |
| 2,055,084 | MacMillin | Sept. 22, 1936 |
| 2,311,564 | Munday | Feb. 16, 1943 |
| 2,373,008 | Becker | Apr. 3, 1945 |